United States Patent [19]
Smith

[11] 3,961,427
[45] June 8, 1976

[54] DEVICE FOR VIEWING THREE DIMENSIONAL PICTURES

[75] Inventor: Robert Smith, Bethpage, N.Y.

[73] Assignee: Lawrence Peska Associates, Inc., New York, N.Y. ; a part interest

[22] Filed: June 23, 1975

[21] Appl. No.: 589,661

[52] U.S. Cl.................................. 35/29 A; 40/72; 273/187 R
[51] Int. Cl.²........................................ G09B 19/22
[58] Field of Search............... 40/35, 104 A, 104.02, 40/104 R, 72, 73, 73.2, 73.4; 35/29, 29 A; 352/99, 129

[56] References Cited
UNITED STATES PATENTS

| | | | |
|---|---|---|---|
| 1,543,605 | 1/1925 | Gavard | 40/104 A X |
| 2,197,268 | 4/1940 | Gold | 352/99 |
| 2,939,224 | 6/1960 | Rose et al. | 35/29 A |
| 3,145,484 | 8/1964 | Bayley | 35/29 R |
| 3,197,888 | 8/1965 | Held | 35/29 R |
| 3,453,746 | 7/1969 | Cartwright | 35/29 A |

Primary Examiner—Louis G. Mancene
Assistant Examiner—Wenceslao J. Contreras
Attorney, Agent, or Firm—Richard E. Nanfeldt

[57] ABSTRACT

A device for viewing three dimensionally a plurality of pictures. The device includes a housing having three viewing ports therein. Three drums are mounted on two horizontal shafts within a chamber of the housing, wherein the shafts are journaled for rotation in bearing blocks. A plurality of panels are affixed onto the peripheries of the drums, wherein the panels are adapted to receive side, front and rear views of the pictures to be viewed through the viewing ports.

6 Claims, 4 Drawing Figures

U.S. Patent June 8, 1976 3,961,427
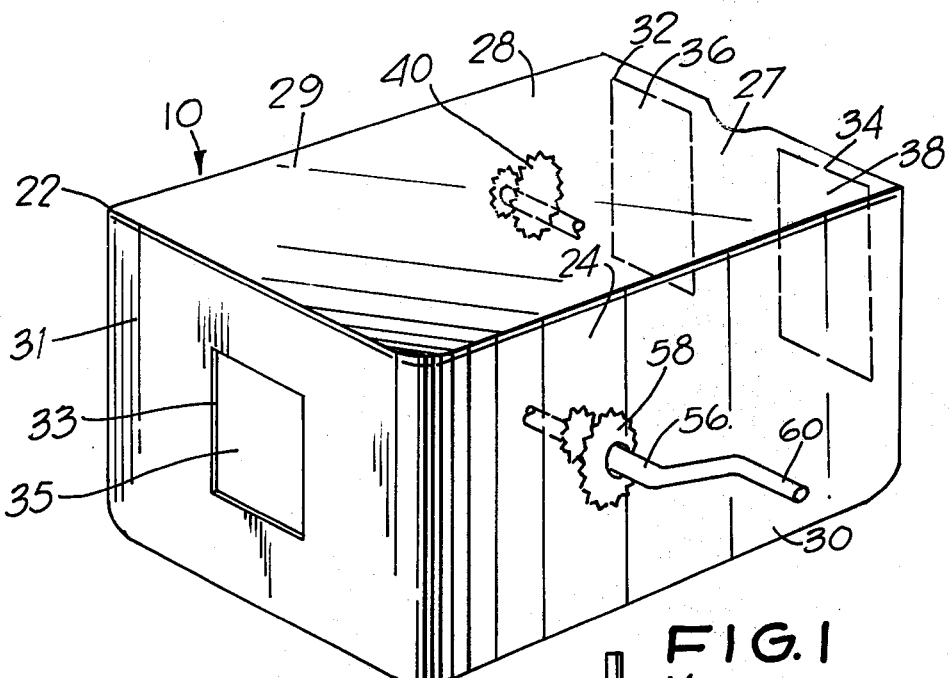
FIG. 1
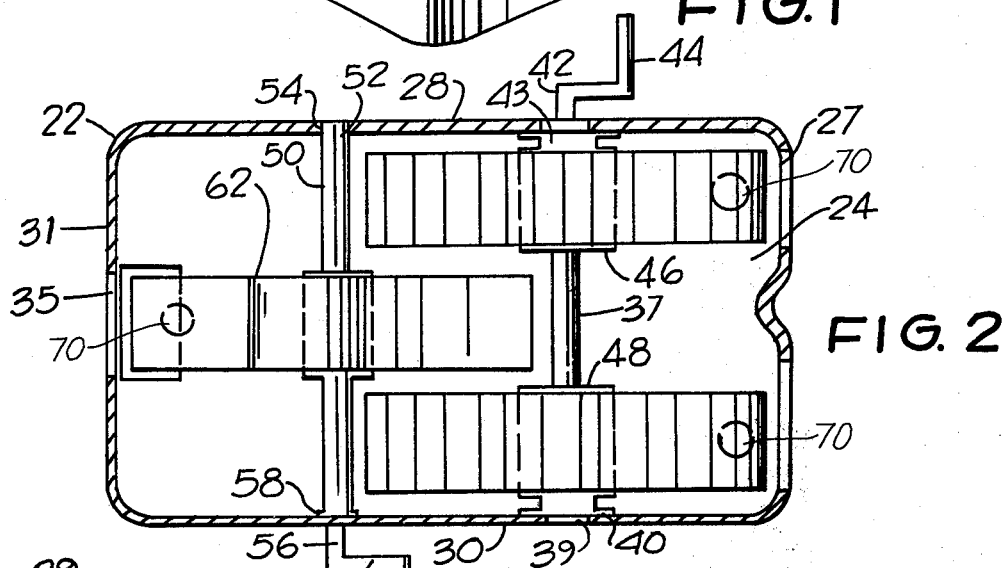
FIG. 2
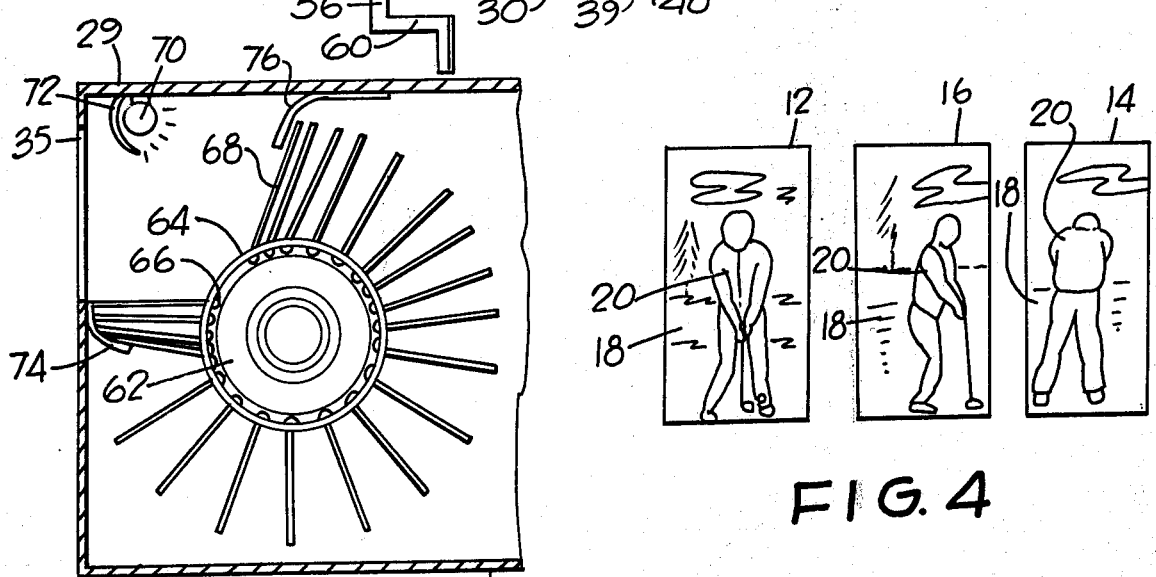
FIG. 3
FIG. 4

DEVICE FOR VIEWING THREE DIMENSIONAL PICTURES

BACKGROUND OF THE INVENTION

A plurality of U.S. Pat. Nos. 1,466,252; 3,159,405; and 3,593,432 have employed various card devices by viewing pictures. U.S. Pat. Nos. 1,315,898 and 1,774,817 have employed box devices for viewing pictures. These aforementioned patents do not provide a means for viewing three dimensionally pictures as does my present invention.

SUMMARY OF THE INVENTION

An object of my present invention is to provide a means for viewing a plurality of pictures three dimensionally as an illustrative aid in teaching various sports.

Briefly, my present invention comprises a housing having three viewing ports therein. Three drums are mounted on two horizontal shafts within a chamber of the housing, wherein the shafts are journaled for rotation in bearing blocks. A plurality of panels are affixed onto the peripheries of the drums, wherein the panels are adapted to receive side, front and rear views of the pictures to be viewed through the viewing ports.

BRIEF DESCRIPTION OF THE DRAWINGS

The objects and features of the invention may be understood with reference to the following detailed description of an illustrative embodiment of the invention, taken together with the accompanying drawings in which:

FIG. 1 illustrates a perspective cross sectional view of a device for viewing three dimensional pictures;

FIG. 2 illustrates a top cross sectional view of the device;

FIG. 3 illustrates a side cross sectional view of a portion of the device; and

FIG. 4 is a panel view of the pictures showing front, side, and rear views.

DESCRIPTION OF THE PREFERRED EMBODIMENT

Turning now descriptively to the drawings, in which similar reference characters denote similar elements throughout the several views, FIGS. 1–3 show a device 10 for exhibiting three dimensional pictures as an educational aid for learning a physical sport. The viewer see a front 12, rear 14 and a side 16 view of an identical picture 18 of a person 20 forming a physical movement in a particular sport. The device 10 comprises a rectangular shaped box housing 22 having an internal chamber 24 therein, a base 26, a pair of upwardly extending sidewalls 28, 30, an upwardly extending front wall 31, an upwardly extending rear wall 27 and a removable top cover 29. The rear wall 27 has a pair of rectangularly shaped apertures 32, 34 therethrough, wherein transparent windows 36, 38 are affixed across aperture 32, 34. One aperture 32 is contained in the right side of wall 27 and the other aperture 34 is contained in the left side of wall 27. The front wall 31 has a hole 33 centrally therethrough, wherein another transparent window 35 is affixed across hole 33. A first horizontally placed shaft 37 is contained within chamber 24, wherein one end 39 of shaft 37 is rotatably mounted in a first bearing block 40 mounted affixed in the rear portion of sidewall 30. The other end 42 of shaft 37 is journaled for rotation through a second bearing block 43 affixed to the rear portion of the other sidewall 28. A first crank handle 44 is integrally joined to end 42 of shaft 37 externally to sidewall 28. First 46 and second 48 drums are mounted on shaft 37 within chamber 24. A second horizontally placed shaft 50 is contained within chamber 24, wherein one end 52 of shaft 50 is rotatably mounted in a third bearing block 54 mounted in a front portion of sidewall 28. The other end 56 of shaft 50 is journaled for rotation through a fourth bearing block 58 affixed in a front portion of the other sidewall 30. A second crank handle 60 is integrally joined to end 56 of shaft 50 externally to sidewall 30. A third frum 62 is mounted onto shaft 50 within chamber 24, wherein drum 62 is positioned between drums 46, 48. The periphery 64 of each drum 46, 48, 62 has a plurality of channels 66 therein. One end of a flexible guide panel 68 is affixed into each channel 66, wherein each panel 68 extends outwardly from the periphery 64 of one of the drums 46, 48, 62. One of the pictures 18 slidably mounts in each of the panels 68. The pictures 18 contained in panels 68 of drum 62 are a front view 12 and are aligned with window 35 for viewing. The pictures 18 contained in panels 68 of drum 46 are side view 16 and are aligned with window 36 for viewing. The pictures 18 contained in panels 68 of drum 48 are a rear view 14 and are aligned with window 38 for viewing. A plurality of light sources 70 with deflector shields 72 are contained within chamber 24, wherein the light sources 70 impinge upon pictures 18 to illuminate the pictures 12, 14, 16 for viewing. For each series of panels 68 a resistent detent 74 is mounted on the inside surface of walls 27, 31. Concave interceptor bars 76 are mounted on the bottom surface of cover 29. The panels 68 of each drum 46, 48, 62 engage detent 74. When each drum 46, 48, 62 is rotated by means of shafts 37, 50 a picture slips by the detent 74 and flips into a vertical position for viewing, wherein it is held in position by an interceptor bar 76. As the pictures 18 are rotated into position they are viewed in the three dimensions of front 12, rear 14 and side 16 views.

Since obvious changes may be made in the specific embodiment of the invention described herein, such modifications being within the spirit and scope of the invention claimed, it is indicated that all matter contained herein is intended as an illustrative and not as limiting in scope.

Having thus described the invention, what I claim as new and desire to secure by Letters Patent of the United States is:

1. A device for exhibiting three dimensional pictures, which comprises:
   a. a housing having an internal chamber therein, a base, a pair of upwardly extending sidewalls, an upwardly extending rear wall, an upwardly extending front wall, a top cover, said rear wall having two apertures therethrough, and said front wall having a hole therethrough;
   b. transparent windows affixed across said apertures and said hole;
   c. three drums contained in said chamber, two said drums aligned with said apertures, and one said drum aligned with said hole;
   d. two of said drums mounted on a first horizontal shaft journaled for rotation in a first pair of bearing blocks affixed in said sidewalls;
   e. a third said drum mounted on a second horizontal shaft journaled for rotation in a second pair of bearing blocks affixed in said sidewalls;

f. means for rotation of said shafts and said drums;

g. a plurality of panels affixed to the outside peripheries of each said drums, said panels extending outwardly from said peripheries of said drums;

h. rear views of said pictures adapted to be in one set of panels affixed to one said drum;

i. front views of said pictures adapted to be received in another set of said panels affixed to said second drum; and j. side views of said pictures adapted to be received in another set of said panels affixed to said third drum.

2. A device according to claim 1, wherein said top cover is removable.

3. A device according to claim 1, wherein said means for rotating includes crank handles integrally affixed to an end of each said shaft externally to said housing.

4. A device according to claim 1, wherein said third drum is positioned between two said other drums.

5. A device according to claim 1, wherein said device further comprises:

a. a plurality of resistent detents affixed to said front and said rear walls, said detents engaging said pictures; and b. a plurality of interceptor bars affixed to said top cover, said bars engaging said pictures.

6. A device according to claim 1, wherein light sources are contained in said chamber, said light sources illuminating said pictures.

* * * * *